United States Patent
Nishimura et al.

(12) 
(10) Patent No.: US 7,093,733 B2
(45) Date of Patent: Aug. 22, 2006

(54) COVER ACTIVATING DEVICE

(75) Inventors: Yoshihide Nishimura, Ehime (JP); Toshihiro Yudate, Mie (JP)

(73) Assignee: TS Corporation, Tokyo (JP)

( * ) Notice: Subject to any disclaimer, the term of this patent is extended or adjusted under 35 U.S.C. 154(b) by 129 days.

(21) Appl. No.: 10/798,537

(22) Filed: Mar. 11, 2004

(65) Prior Publication Data
US 2004/0188441 A1 Sep. 30, 2004

(30) Foreign Application Priority Data
Mar. 11, 2003 (JP) .......................... P2003-064446

(51) Int. Cl.
*B65D 53/00* (2006.01)

(52) U.S. Cl. ..................... 220/236; 220/829

(58) Field of Classification Search ................ 220/263, 220/829, 264, 211, 212.5, 244, 251, 815–817, 220/836, 810; 366/139; 422/102, 296
See application file for complete search history.

(56) References Cited

U.S. PATENT DOCUMENTS 3,499,571 A * 3/1970 Mortara ....................... 220/246
3,765,562 A 10/1973 Shulz
4,516,859 A 5/1985 Spengler et al.
4,625,888 A * 12/1986 Thompson ................... 220/262
4,655,365 A 4/1987 Miller
4,680,969 A * 7/1987 Hama et al. .................... 73/661

FOREIGN PATENT DOCUMENTS

DE 1 211 878 3/1966
JP 10089482 4/1998

* cited by examiner

*Primary Examiner*—Lien M. Ngo
(74) *Attorney, Agent, or Firm*—Akin Gump Strauss Hauer & Feld, LLP

(57) ABSTRACT

An activating device activates a cover for the opening face of a container. Pivot arms are fixed to a pivot unit equipped with an electric motor through a reduction gear at one ends, and fixed to plate springs at the other ends. One end portions of the plate springs are fixed to the respective front and rear portions of the cover, the other end portions thereof are fixed to the other ends of the pivot arms. The resiliency of the plate spring is set lower in the vertical direction of the container. The plate spring is bent from its other end portion toward its one end portion at substantially 90° or larger of bending angle. The plate spring is formed so that it bends toward the inside of the center of the cover between the pivot arm and the cover.

10 Claims, 6 Drawing Sheets

COVER ACTIVATING DEVICE

The present application is based on Japanese Patent Application No. 2003-64446, the entire contents of which are incorporated herein by reference.

BACKGROUND OF THE INVENTION

1. Field of the Invention

The present invention relates to an activating device for opening and closing the opening faces of various kinds of containers by turning the covers of the containers such as vacuum chambers.

2. Related Art

As disclosed in JP-A-10-89482, the related art activating structure of a cover for a vacuum chamber is as shown in FIG. 8, for example. More specifically, the cover 2 of a vacuum chamber 1 is supported by cover arms 3 (long) and cover arms 4 (short) forming a link mechanism, and the open-and-close driving is transmitted from a motor 6 on a motor driving plate 5 via worm gears (not shown), worm wheels (not shown), drive wires 7 and bevel gears 8.

Further, the whole drive mechanism for opening and closing the cover 2 is located on the motor driving plate 5 and arm supporting bases 9 on the right and left and is made movable vertically by slide bearings 10 and a slide bearing 12 supported by a cylinder supporting metal fitting 11. A cylinder 13 for vertically sliding these component parts is mounted to the cylinder supporting metal fitting 11 fixed to the chamber 1.

The operation of closing of the cover in the activating structure of the cover for the vacuum chamber with the cover 2 opened as shown by an imaginary line in FIG. 8 is performed as follows. When the motor 6 is driven, the rotary motion is reduced by the worm gears and the worm wheels and the reduced rotary motion is divided right and left. When the rotary motion is given to the cover arms (long) 3 on the right and left sides by the drive wires 7 and the bevel gears 8, respectively, the cover arms (short) 4 also rotate accordingly. The cover 2 is moved without parting from the chamber 1 by long and short arm mechanisms and gradually so closed as to form a gap where the contact surface of the cover 2 and the surface of the chamber are set parallel to each other. Subsequently, the whole cover driving mechanism on the motor driving plate 5 and the right and left arm supporting bases 9 as well as the cover 2 coupled to the cover driving mechanism are descended by the suction force of the cylinder 13, so that the cover 2 is closed by uniform pressurizing force.

The related art has posed the following problem because it is characterized by the aforementioned arrangement and operation.

The related art activating structure of a cover for a vacuum chamber as disclosed in JP-A-10-89482 is equipped with the arm link mechanism in which two kinds of cover arms including the long and short cover arms 3 and 4 are fixed to the vacuum chamber 1 simultaneously with the cylinder driving mechanism comprising the motor 6, the worm gears, the worm wheels and the cylinder 13 for use in turning and moving the cover when the cover 2 is opened and causing the arm link mechanism together with the cover 2 to descend immediately before the cover 2 is closed. Consequently, the problem is that the apparatus tends to become large in scale and complicated in structure, which results in an increase in the installation space and poor drive transmission efficiency in the operation of the apparatus. Moreover, since the open-and-close device for the cover is provided on both sides of the vacuum chamber 1, the position of a gateway used for receiving products such as a liquid crystal material and normally opened to the side of the vacuum chamber 1 is restricted.

In the related art without supporting the cover 2 in a flexible floating condition with respect to the arms, it is needed to make an actual thing positioning adjustment among the surface of the vacuum chamber 1, the cover 2 and the open-and-close device for the cover in order that a seal member and the cover located on the surface of the vacuum chamber are uniformly pressurized. Driving the cover to turn is difficult to control delicately and when the cover 2 is closed onto the vacuum chamber 1, for example, the opening face of the vacuum chamber 1 and the cover may induce a slip-off phenomenon and an overload as well as an impact may also be applied to the opening face of the vacuum chamber 1. Consequently, the problem in this case is that the seal member (O-ring) installed on the opening face of the vacuum chamber 1 may be damaged.

SUMMARY OF THE INVENTION

An object of the invention made to solve problems existing in the aforementioned related art is to provide an activating device for a cover, intended to improve not only space efficiency per quantity of component parts produced that are required to be highly clean but also durability of a seal member (O-ring) provided for the opening face of a container such as a vacuum chamber, the activating device being simple in structure with enhanced cover driving control performance and materialized by following structure.

(1) According to the invention, an activating device for a cover, comprises a container having an opening face, a cover for covering the opening face of the container, pivot arms coupled to the cover, and a pivot unit for making the cover open and close the opening face of the container, the activating device therefor including plate springs, each of which has a first portion fixed to the pivot arm and a second portion fixed to the cover, with a portion provided between both the first and second portions is bent.

Consequently, the action of controlling the turning of the cover and controlling the opening and closing of the container takes effect with simple pivot arm structure without using apparatus complicated in structure such as a link mechanism and a cylinder mechanism.

(2) According to the invention, an activating device for a cover, comprises a container having an opening face, a cover for covering the opening face of the container, pivot arms coupled to the cover, and a pivot unit for making the cover open and close the opening face of the container, the activating device therefor including one plate spring so that its intermediate portion is fixed to the pivot arms and that first portions in front and rear are fixed to the cover, wherein portions provided between first portions in front and rear and the intermediate portion are bent.

Consequently, the action of curtailing the number of plate springs and simple structure for quickly fixing the plate spring to the pivot arm or the cover takes effect.

(3) According to the invention, the plate spring is bent so as to form a bending angle of 90° or larger.

Consequently, the action of enlarging the bending angle when the cover is separated from the opening face of the container or suspended in midair or narrowing the bending angle when the cover is closed onto the opening face of the container so as to increase the degree of adhesion between the cover and the opening face takes effect. As the bending angle is not an obtuse angle, forming of the plate spring is facilitated.

(4) According to the invention, in the activating device for a cover, a plurality of plate springs are provided.

Consequently, the action of arranging the number of plate springs corresponding to the number of pivot arms arranged or arranging a plurality of plate springs for a single pivot arm takes effect, so that the durability of the plate spring is improved even when excessive weight is added to the cover.

(5) According to the invention, in the activating device for a cover, the plurality of plate springs are provided such that at least one pair of plate springs are arranged in a row.

Consequently, the action of suppressing the shaking of the cover with respect to the pivoting of the pivot arms takes effect as the weight uniformly added to the cover from the longitudinal and lateral directions is uniformly supported by the plate springs with the elastic force of the plate springs fixed to the pivot arms.

(6) According to the invention, in the activating device for a cover, the pivot unit is an electric motor with a reduction gear.

Consequently, a motor unit for general use can be employed, whereby the invention can be embodied and applied to various applications more easily.

(7) According to the invention, in the activating device for a cover, the container is a vacuum chamber.

Consequently, the action of applying a wide range of activating device for a cover to vacuum chambers takes effect.

DETAILED DESCRIPTION OF THE PREFERRED EMBODIMENTS

An activating device for a cover, embodying the invention will now be described in detail by reference to the accompanying drawings.

Figure 1:
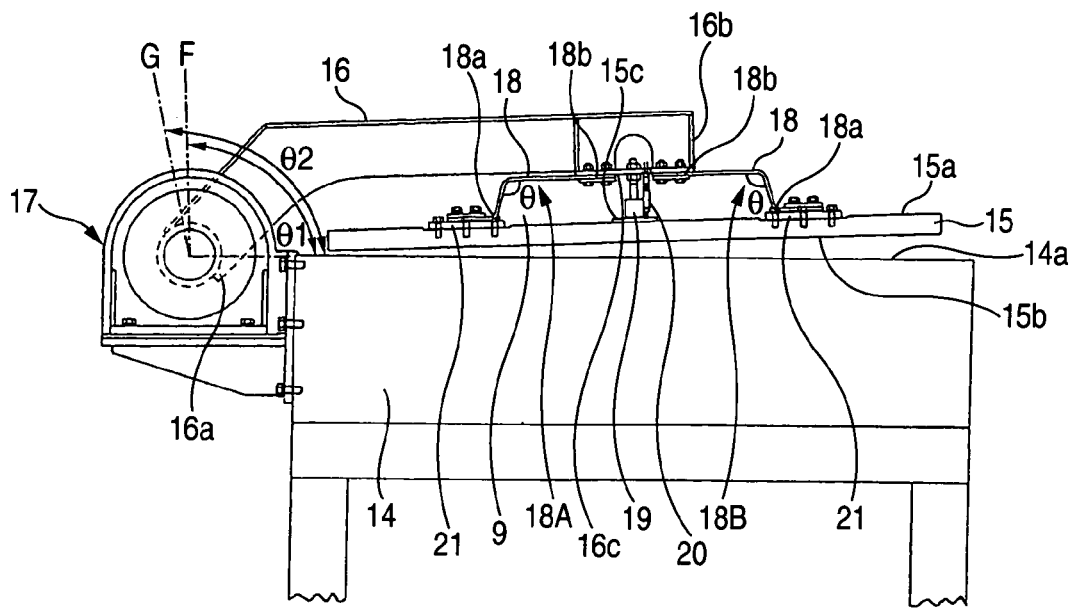
FIG. 1 is a side view of an activating device for a cover according to an embodiment of the invention with pivot arms suspending the cover in midair from a container.
Figure 2:
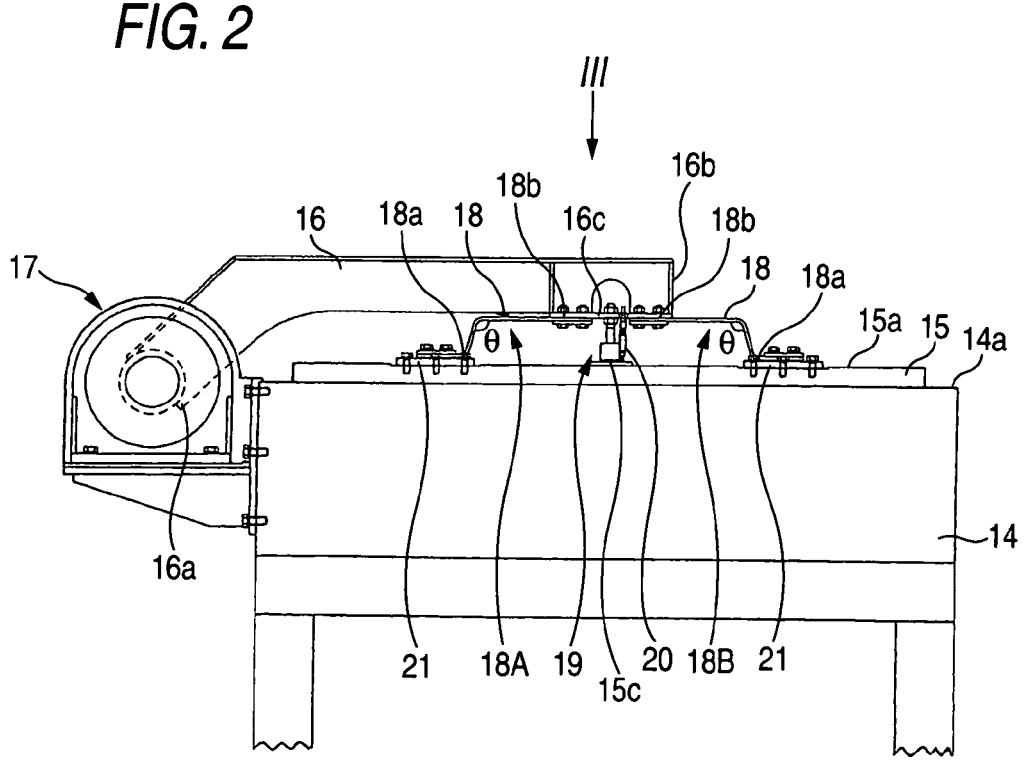
FIG. 2 is a side view of the activating device for a cover according to the embodiment of the invention with the pivot arms operating to close the container with the cover.
Figure 3:
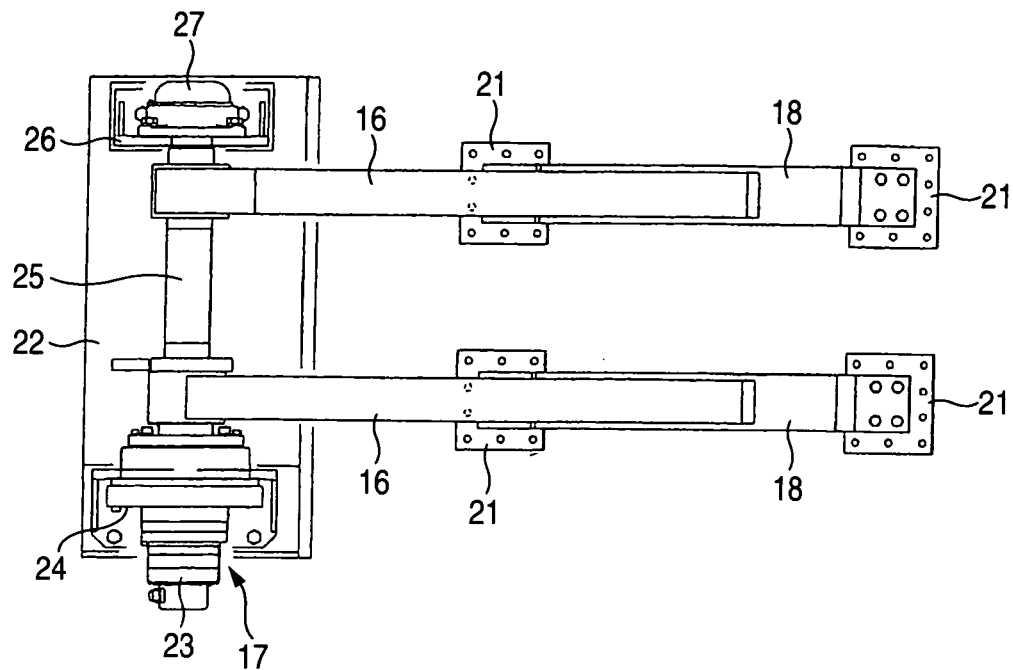
FIG. 3 is a plan view taken on line III—III in the direction of arrows in FIG. 2.

FIG. 1 is a side view of an activating device for a cover according to an embodiment of the invention with pivot arms suspending the cover in midair from a container. FIG. 2 is a side view of the activating device for a cover according to the embodiment of the invention with the pivot arms operating to close the container with the cover. FIG. 3 is a plan view taken on line III—III in the direction of arrows in FIG. 2.

In these drawings, reference numeral 14 denotes various kinds of containers such as a chamber of a vacuum device whose opening face 14a is substantially square or circular, for example; 15, a cover for covering the opening face 14a of the container 14 in a sealing manner, having a configuration substantially similar to that of the opening face 14a; 16, pivot arms, each with one end 16a fixed to a pivot unit 17 formed with a motor such as a servo motor with a reduction gear, the other end 16b being fixed to plate springs 18 substantially T-shaped in cross section, for example.

Figure 4:
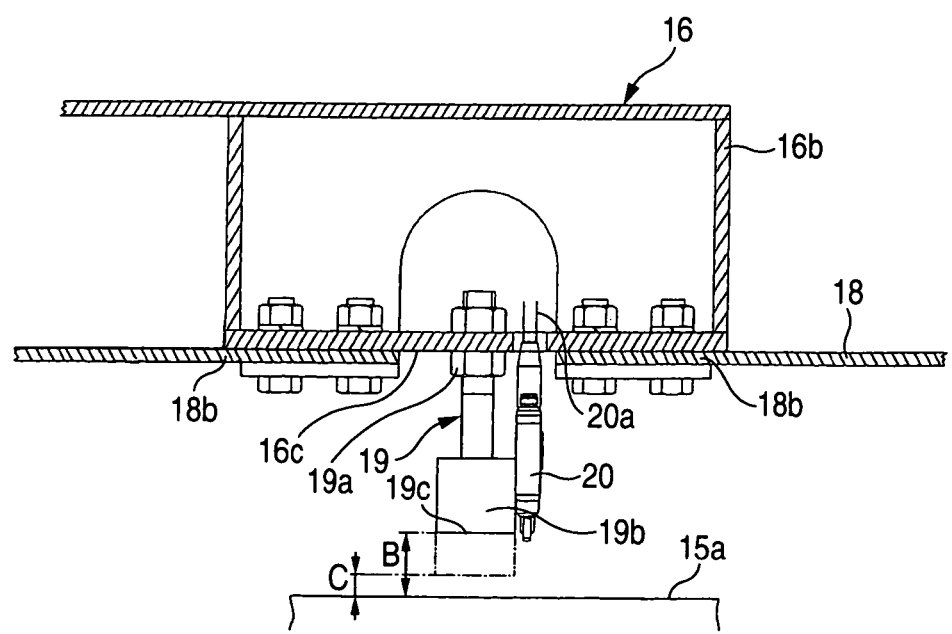
FIG. 4 is an enlarged sectional view of an arrangement of a stopper and a position sensor in the activating device for a cover according to the embodiment of the invention.

As shown in FIGS. 2 and 4, one end portions (first portions) 18a of the plate springs 18 are fixed to the under surface 16c of the other end 16b of the pivot arm 16, whereas the other end portions (second portions) 18b thereof are fixed to the respective front and rear portions of the cover 15 with clamping members such as bolts. Further, the plate spring 18 is formed with a thin metal sheet, for example, so that the resiliency in the direction normal to the opening face 14a of the container 14, that is, the resiliency in the vertical direction of the container 14 is set lower than resiliency in planar directions (front/rear and lateral directions of the opening face 14a) as will be described later.

Two or a plurality of plate springs 18 are provided corresponding to the number of pivot arms 16 to be mounted as shown in FIG. 3. For the individual plate spring 18. Spring pieces 18A and 18B may be provided on both sides and bonded together in the intermediate portion so as to be integrated into a single sheet of plate spring 18, as an alternative of providing the plate spring 18 by combination of two spring pieces 18A and 18B as shown in FIG. 1. In the case bonding the two spring pieces 18A and 18B with the intermediate portion, the intermediate portion of the one sheet of plate spring 18 is fixed to the other end 16b of the pivot arm 16 and the longitudinal one end portions thereof are fixed to the cover 15, so that the plate spring 18 is bent between both the longitudinal one end portions and the intermediate portion (the plate spring is bent at two places). Although each of the spring pieces 18A and 18B and the one sheet of plate spring 18 are bent at one place between both the fixed end portions, these plate springs may be bent at a plurality of places. Moreover, each plate spring 18 may be formed by arranging a pair of spring pieces in a row so as to dispersively bear the weight of the cover 15, which makes it possible to suppress shaking when the pivot arms 16 are driven. Also, the pair of the plate springs 18 may be fixed to the cover so that the plate springs 18 may be arranged in parallel with one another on the cover 15.

As shown in FIG. 1, the plate spring 18 is bent from the other end portion 18b toward the one end portion 18a at 105° as a bending angle θ. It is thus preferred that the bending angle θ is 9020 or larger. In other words, the plate spring 18 is formed so that it bends from the portion fixed to the pivot arm 16 toward the inner side of the center of the cover 15 between the pivot arm 16 and the cover 15 and as the bending angle of the plate spring is an obtuse angle, repetitive fatigue hardly occurs in the obtuse angle portion and the plate spring becomes easily formed. As the plate spring 18 is supported in a floating condition with respect to the arm, it can be brought into contact with the opening face 14a of the container 12 or a seal member in an adaptable fashion under uniform pressure without any shock. Therefore, the durability of the seal member is improved because the squashing margin of the seal member is made free from variation on the periphery. Moreover, an actual thing positioning adjustment among the container surface, the cover and the open-and-close device can be dispensed with.

Further, since the open-and-close device for a cover is provided sidewise at only one place of the container 14, the position of a gateway used for receiving products such as a liquid crystal material and normally opened to the side of the vacuum chamber 1 is less restricted than before.

The plate spring 18 whose one end is fixed to the pivot arm, the other end being fixed to the cover, with the bent portion provided between both end portions, is readily bent as the spring constant is low in the vertical direction (in the direction of thickness of the cover) but hardly bent as the spring constant in the lateral direction (in the planar direction of the cover) is high by nature. In other words, the activating device for the cover, using the plate springs 18 allowing for pitching as desired but suppressing rolling, makes unnecessary a shaking preventive device (a guide) for the cover 15.

Reference numeral 19 denotes a stopper which is disposed in a space inside the bent plate spring 18 and as shown in FIG. 4 the upper end of the stopper is fixed to the under surface 16c of the pivot arm 16 with clamping bolt and nut 19a with a position sensor 20 provided to the body portion 19b as an adjunct. The position sensor 20 operates to measure a gap between the under surface 19c of the stopper 19 and the surface 15a of the cover 15 according to a signal from a control unit (not shown) connected to the position sensor via a lead wire 20a. As shown in FIGS. 1 and 2, the gap between the under surface 19c of the stopper 19 and a holding seat 15c instead of the surface 15a is measured in case that the holding seat 15c is formed on the surface 15a of the cover 15.

In FIG. 3, reference numeral 21 denotes a spring seat plate fixed to the one end portion 18a of each plate spring 18 but the spring seat plate may not necessarily be provided to this apparatus. Reference numeral 22 denotes an installation base of the pivot unit 17; 23, an actuator of the pivot unit; 24, a motor bracket; 25, a shaft; 26, a bearing bracket; and 27, a bearing unit.

The operation of the activating device and a method of opening and closing the cover will be described next.

Operation with the Cover Opened.

FIG. 2 shows the cover 15 in a closed condition on the opening face 14a of the container 14. The pivot arms 16 are pivoted counterclockwise when the pivot unit 17 is driven in that state above. As shown in a rotation control characteristic diagram of FIG. 5A, the pivot unit 17 and the pivot arms 16 are started to operate with an acceleration time of 0.13 (sec) and at a relatively low constant rotation rate of 0.13 (deg/sec), for example. At this time, the elastic force of the plate springs 18 is gradually increased and the plate springs are released from the seal member (O-ring) (not shown) fitted to the opening face 14a of the container 14 and the adhesive capacity of the cover 15. The plate springs 18 then perform tensile action, so that the bending angle θ is enlarged further.

As shown in FIG. 1, the cover 15 and the opening face 14a of the container 14 is in such a state that the cover 15 is separated from the opening face 14a of the container 14 and suspended in midair. The gap between the under surface 19c of the stopper 19 and the surface 15a of the cover 15 in this state is as shown in FIG. 4 subjected to positioning adjustment in accordance with a predetermined set dimension 3 (mm), for example. The measurement of the predetermined dimension is made by the position sensor 20 attached to the body portion 19b of the stopper 19.

The plate springs 18 keep the cover 15 flexibly floating with respect to the arms and are capable of lifting up or down the cover 15 and also perform a cover holding-down function for holding down the cover 15. The cover holding-down function may be undertaken by any other means.

The seal member (O-ring) may be fitted to the underside 15b of the cover 15 in place of the opening face 14a of the cover 14.

Figure 5A:
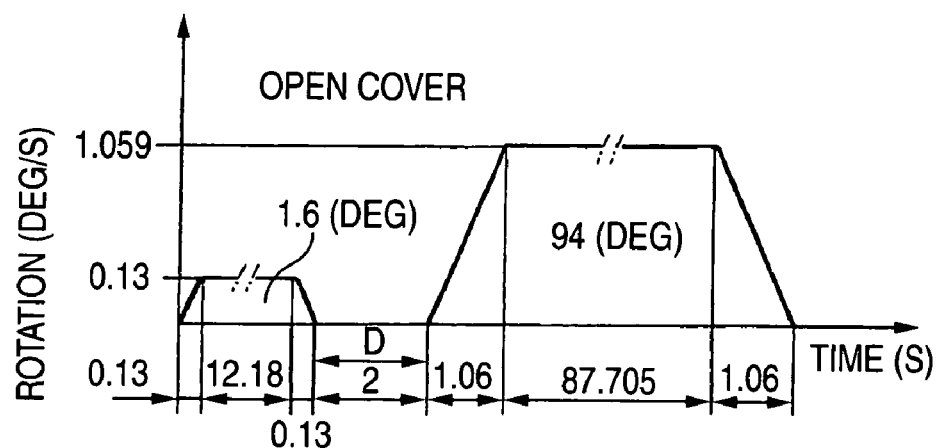
FIGS. 5A and 5B are rotation control characteristic diagrams of the pivot arm or the pivot unit in the activating device for a cover according to the embodiment of the invention, showing characteristics in open condition of the cover (shown in FIG. 5A) and closed condition of the cover (shown in FIG. 5B)

The cover 15 is then stopped once for two seconds as shown by a stop time D in FIG. 5A until the shaking of the cover 15 decreases in a position immediately after the cover 15 is separated from the seal member (O-ring) fitted to the opening face 14a of the container 14.

The pivot arms 16 pivot counterclockwise further from this point of time when the pivot unit 17 is driven. As shown in the rotation control characteristic diagram of FIG. 5A, the pivot unit 17 and the pivot arms 16 are started to operate again with an acceleration time of 0.16 (sec) and at a relatively high constant rotation rate of 1.059 (deg/sec), for example. The pivot unit 17 then stops with a deceleration time of 1.06 (sec). At this time, the pivot arms 16 or the cover 15 makes a turning movement up to an angle θ1, for example, 95° of the totally opened cover as shown in FIG. 1.

Figure 6:
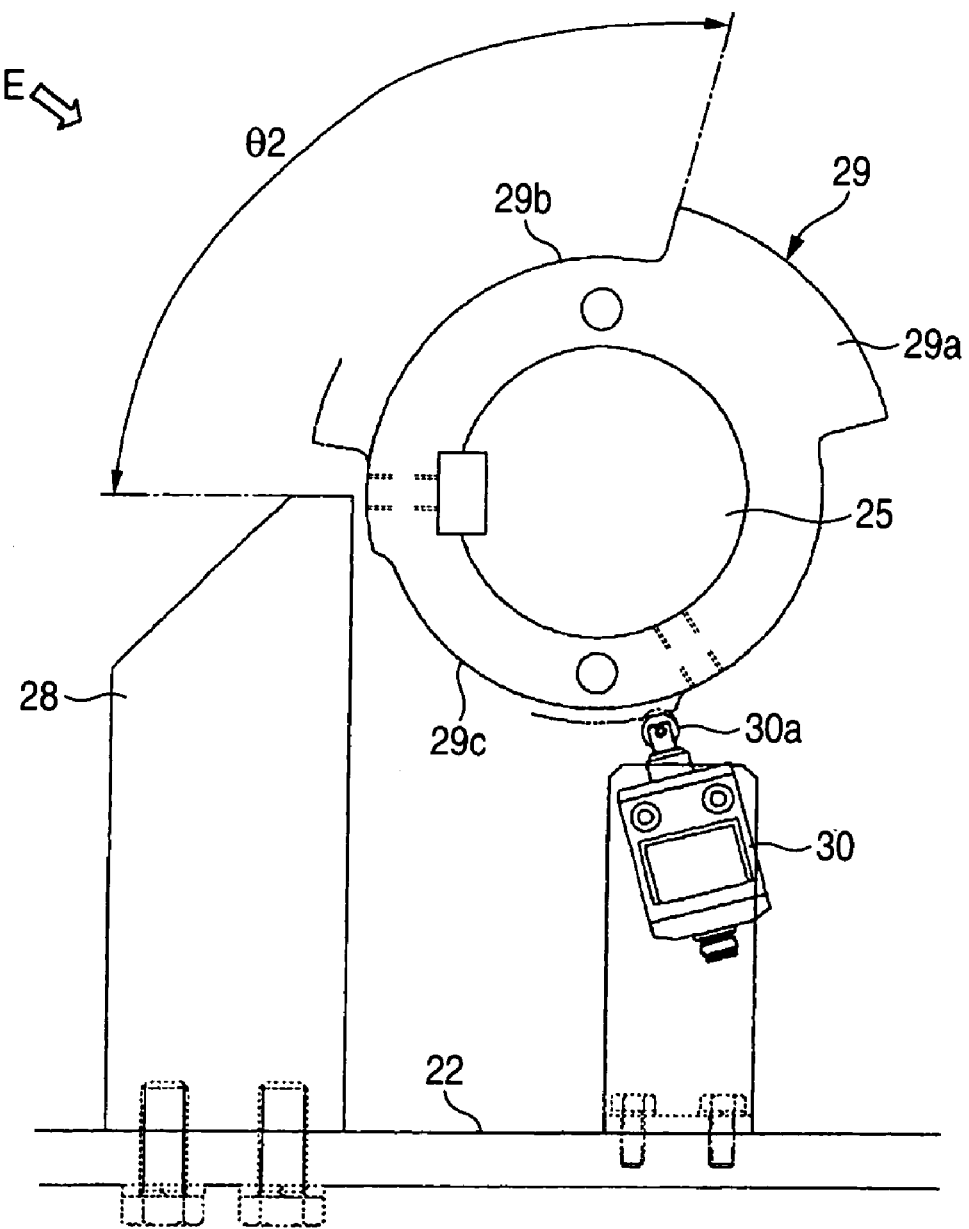
FIG. 6 is a side view of an arrangement of pivot arm regulating device in the activating device for a cover according to the embodiment of the invention.

In case the pivot unit 17 or the cover 15 pivots over the angle θ1 of the totally opened cover, the cover 15 is restrained from opening over a predetermined angle θ2 through the operation of a pivot arm regulating device E attached to the pivot unit 17 as shown in FIG. 6. The pivot arm regulating device E comprises a stopper portion 28 fixed to the installation base 22, a cam portion 29 abutted against the stopper portion 28 and a limit switch 30 provided as an adjunct to the cam portion 29. The cam portion 29 is directly coupled to the shaft 25 of the pivot unit 17 and has a protrusion 29a abutted against the stopper portion 28 and used to regulate the rotation of the pivot arms 16; the cam portion 29 having a difference-in-level step consecutively from the top portion of the protrusion 29a; a contact surface 29b formed in a manner corresponding to the pivot arm regulating angle θ1, for example, 95°; and a noncontact surface 29c having a difference-in-level step consecutively from the contact surface 29b. The sensor contact maker 30a of the limit switch 30 contacts the contact surface 29b so as to control the rotation regulating operation of the pivot arms 16, that is, the cover 15.

More specifically, the sensor contact terminal 30a of the limit switch 30 runs onto the contact surface 29b when the pivot arms 16 and the cover 15 pivot up to the angle θ1 of the totally opened cover as the pivot unit 17 is driven. Thus, the limit switch 30 performs the switching operation and transmits its switching signal to the control unit of the pivot arms 16 or the pivot unit 17 and also stops the working of the pivot arms 16 and the pivot unit 17, so that the pivot arms do not exceed the pivot arm regulating angle θ1.

In case that the pivot arms 16 pivot by an angle exceeding the pivot arm regulating angle θ1 by any chance due to the suspension of the operation of a power supply, a malfunction of the control portion and so forth, the protrusion 29a of the cam portion 29 of the pivot arm regulating device E pivots up to the regulating position of the pivot arm regulating angle θ2 before abutting against the stopper portion 28 when the pivot arms pivot up to the regulating position G of the pivot arm regulating angle θ2, for example, 105°, whereby the pivot arms stop pivoting to secure safety.

The set values of the angle θ1 of the totally opened cover and the pivot arm regulating angle θ2 can properly be changed with the design specification of the activating device for the cover. When the activating device for the cover is assembled so that the under surface of the cover 15 and the surface of chamber 1 are parallel to each other immediately when the cover 15 is closed, it is preferred to measure the gap between the undersurface of the cover 15 and the surface of the chamber 1 to see whether a desired parallel degree is established by inserting a parallel spacer therebetween. Moreover, the activating device for the cover may be assembled with the cover closed by inserting the parallel spacer.

Operation with the Cover Closed.

Figure 5B:
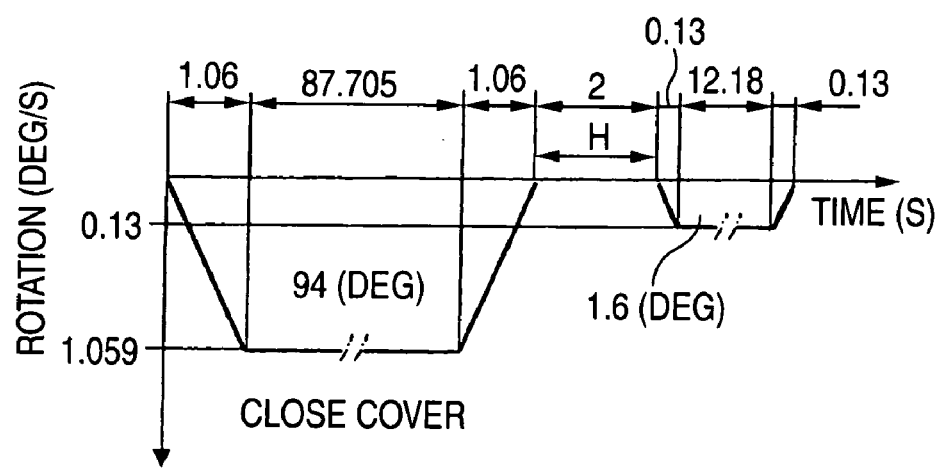

The pivot arms 16 is driven to pivot by the pivot unit 17 clockwise from the full open position F of the angle θ1 of the totally opened cover as shown in FIG. 1. As shown in the rotation control characteristic diagram of FIG. 5B, the pivot unit 17 and the pivot arm 16 are started with an acceleration time of 1.06 (sec) at a relatively high constant rotation rate of 1.059 (deg/sec), for example. The cover 15 is then stopped once for two seconds as shown by a stop time H until the shaking of the cover 15 decreases. When the cover 15 fixed to the plate springs 18 is pivoted up to where it is drawn near the opening face 14a of the container 14, that is, it is pivoted up to this side where it is brought into contact with the opening face thereof, the moving velocity of the pivot arms 16 driven by the pivot unit 17 is lowered with an acceleration time of 0.13 (sec) at a constant rotation rate of 0.13 (deg/sec), for example, as shown in FIG. 5B. The cover 15 is caused to descend from right above the opening face 14a of the container 14 without shaking longitudinally or laterally whereby to complete the operation of closing the cover 15. Although a range from a cover opening position up to a cover closing position is set to 95°, the pivot arms 16 are operated by 95.6° from an opening condition to a closing condition. Therefore, a difference of 0.6° (95.6–95) is equivalent to a state in which the plate springs 18 shrinks. At this time, the cover 15 is in such a condition that it forces the seal member (O-ring) in and a small gap is maintained in between the opening face of the container 14 and the lower edge face of the cover 15. Before the cover 15 makes contact with the seal member (O-ring), the seal member (O-ring) remains to project by about 1 mm from the opening face of the container 14.

Consequently, the cover 15 is allowed to make intimate contact with the opening face 14a of the container 14 without causing the cover 15 to slip off the opening face 14a and without causing the under surface 15b of the cover 15 to slip off the seal member (O-ring) fitted to the opening face 14a. This is because the pivot arms 16 keep holding down the plate springs 18 and while narrowing the bending angle θ, the pivot arms 16 add the weight of the cover 15 to the seal member (O-ring) or the opening face 14a and make the positioning adjustment by setting the gap C between the under surface 19c of the stopper 19 and the surface 15a of the cover 15 to the predetermined dimension, for example, one (mm) as shown in FIG. 4. The predetermined dimension is measured by the position sensor 20 attached to the body portion 19b of the stopper 19.

Thus, the invention provides the method of measuring the surface 15a of the cover 15 and the undersurface 19c of the stopper 19 is such that, in addition to the activating device for the cover, comprising the container 14 having the opening face 14a, the cover 15 for covering the opening face 14a of the container 14, the pivot arms 16 coupled to the cover 15 and the pivot unit 17 for making the cover 15 open and close the opening face 14a of the container 14 by pivoting the pivot arms 16, the above method of measuring is the art of measuring the surface 15a of the cover 15 and the undersurface 19c of the stopper 19 by employing the plate springs 18 capable of providing the cover holding-down function, each plate spring having the one end 18b fixed to the pivot arm 16 and the other end 18a used to support the arm fixed to the cover 15 in a floating condition, the stopper 19 mounted to the pivot arm 16 and the position sensor 20. In the method of driving the cover 15 to open and close the opening face 14a of the container 14, by employing the container 14 having the opening face 14a, the cover 15 for covering the opening face 14a of the container 14, the pivot arms 16 coupled to the cover 15 and the pivot unit 17 for making the cover 15 open and close the opening face 14a of the container 14 by pivoting the pivot arms 16, the method of opening and closing the cover is such that when the cover 15 closes the seal member (O-ring) or the opening face 14a of the container 14, the moving velocity of the pivot arms 16 is lowered on this side where the cover 15 is brought into contact with the seal member (O-ring) or the opening face 14a of the container 14; or otherwise the art of opening and closing the cover is such that when the cover 15 is opened, the pivot arms are moved at a predetermined low velocity until the cover 15 is separated by a predetermined quantity from the opening face 14a of the container 14 and the pivot arm is moved at a velocity higher than the predetermined low velocity when the cover 15 is separated by a predetermined quantity therefrom.

Figure 7:
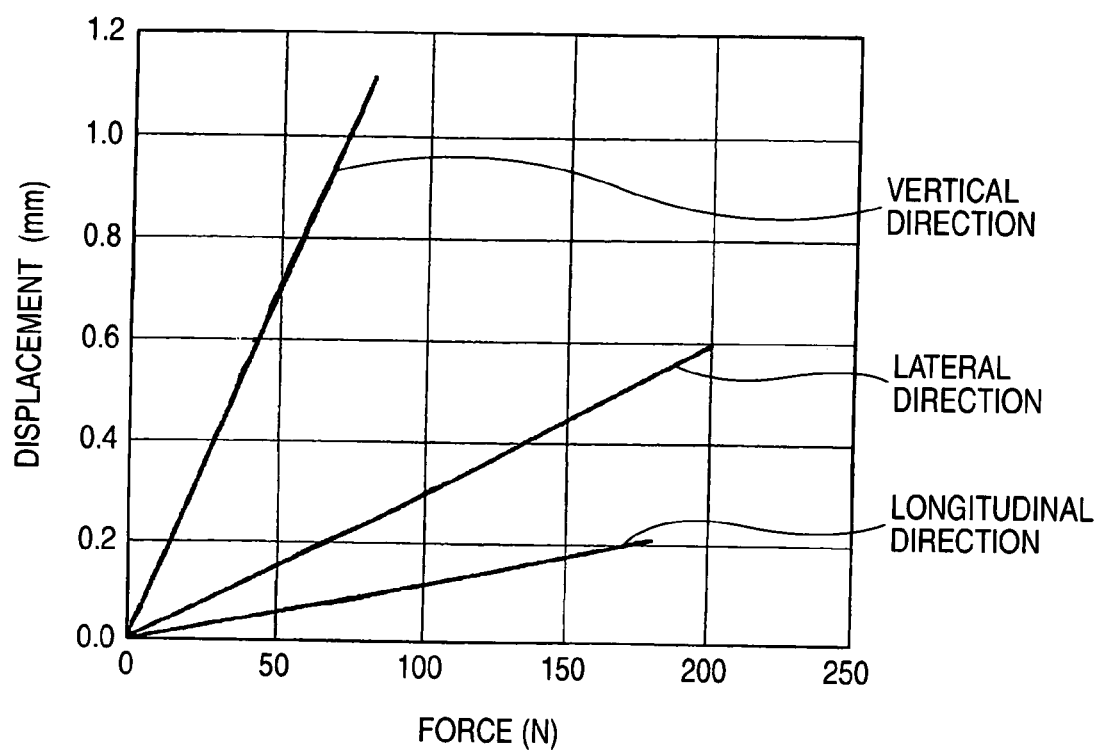
FIG. 7 is a force-displacement characteristic diagram of the plate spring in the activating device for a cover according to the embodiment of the invention.
Figure 8:
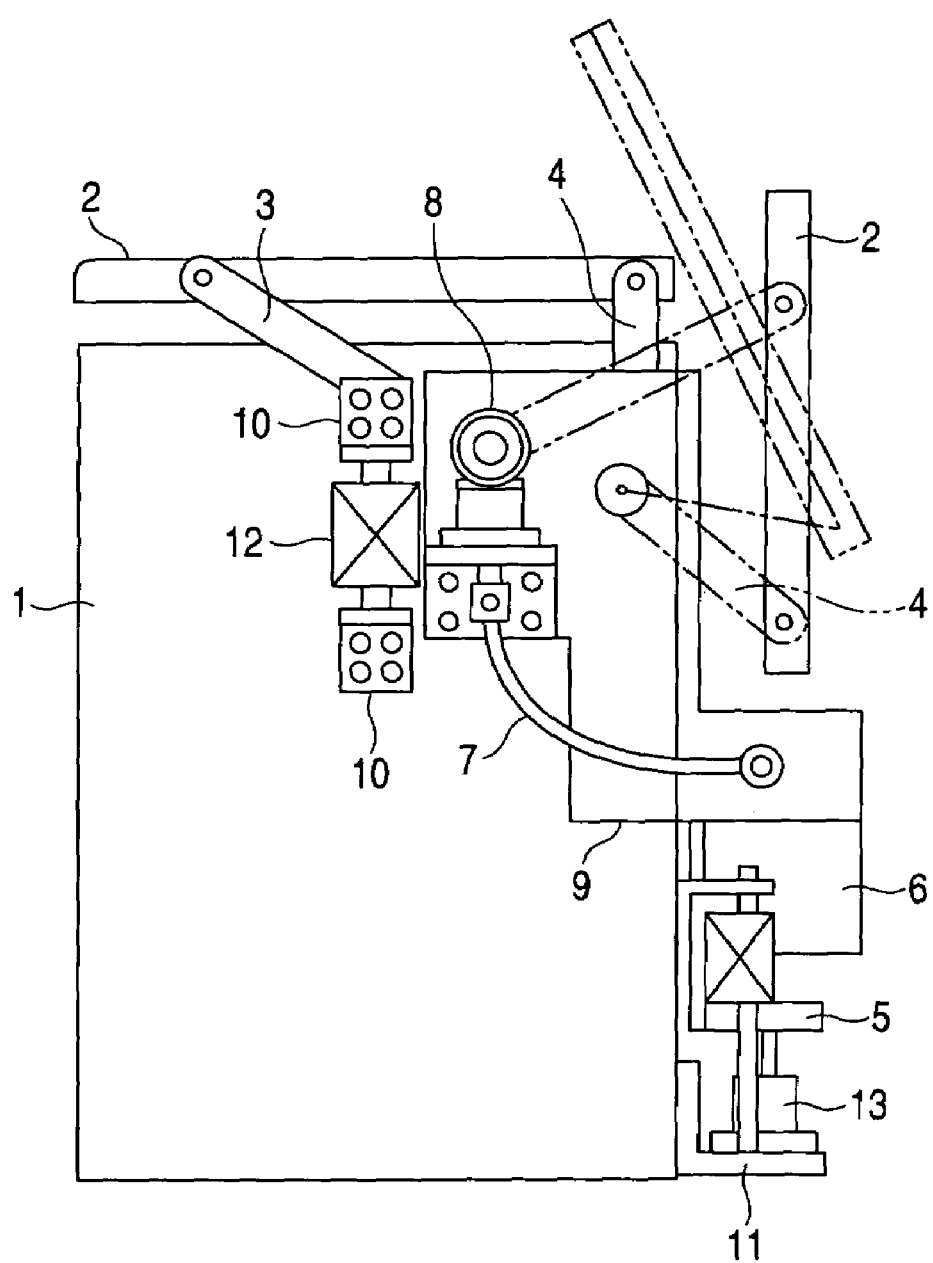
FIG. 8 is a side view of a related art activating structure of a cover for a vacuum chamber.

The operation of the plate springs in the activating device according to the embodiment of the invention will be described in detail next by reference to a force-displacement characteristic diagram of FIG. 7.

When the pivot arms 16 releases the cover 15 from the opening face 14a of the container 14 by driving the pivot unit 17, the cover is pivoted from a 0° position up to the angle θ1 of the totally opened cover and when the cover 15 is moved to close the opening face 14a of the container 14, the cover is pivoted from the angle θ1 of the totally opened cover up to the 0° position. At this time, the cover 15 tends to shake longitudinally and laterally and it has been proved that the open-and-close operation of the cover is optimized by setting spring constants to the plate springs 18 as follows:

The vertical spring constant of the plate spring 18 is set low so that the position of the cover 15 fits in the opening face 14a of the container 14 with weak force. Calculations made from the characteristic diagram of FIG. 7 have resulted in the following: the vertical spring constant of the plate spring $18=80/1.09=74$ (N/mm).

The lateral spring constant of the plate spring 18 is set relatively high whereby to suppress the cover 15 from shaking. Calculations made from the characteristic diagram of FIG. 7 have resulted in the following: the lateral spring constant of the plate spring $18=200/0.6=336$ (N/mm).

The longitudinal spring constant of the plate spring 18 is set relatively high as in the case of the lateral spring constant of the plate spring 18 whereby to suppress the cover 15 from shaking. Calculations made from the characteristic diagram of FIG. 7 have resulted in the following: the longitudinal spring constant of the plate spring $18=180/0.2=900$ (N/mm).

Since the cover is arranged so as to be kept floating by the bent plate springs with respect to the pivot arms in the activating device according to the invention, the following effects are achievable.

More specifically, the invention has the effect of providing the activating device for a cover, simple in structure and small in scale without using a link mechanism and a cylinder mechanism by attempting to improve not only space efficiency per quantity of component parts produced but also durability of the seal member fitted to the opening face of the container.

Moreover, the invention has the effect of improving sealing strength by providing the pivot unit capable of position control for lowering the moving velocity of the pivot arms on this side where the cover is brought into contact with the opening face of the container or when the cover is separated therefrom after the cover is separated by the predetermined quantity from the stop position of the container or after the cover is set close to the opening face of the container through the high-velocity movement from the full-open position of the container, so that the predetermined pressuring force is applied to the mass of the cover and also uniformly to the seal member or the opening face of the container, whereby the function of controlling the driving of the pivot arms is enhanced and the positional slip-off of the cover is prevented as the cover opens and closes.

What is claimed is:

1. An activating device for a cover, comprising:
   a container having an opening face;
   the cover which covers the opening face of the container;
   at least one pivot arm coupled to the cover;
   a pivot unit driving the pivot arm so that the cover opens and closes the opening face of the container; and
   a plate spring provided with at least one spring piece having a first portion fixed to the pivot arm and a second portion fixed to the cover, wherein a portion provided between both the first and second portions is bent.

2. An activating device for a cover, comprising:
   a container having an opening face;
   the cover for covering the opening face of the container by pivoting the pivot arms;
   at least one pivot arm coupled to the cover;
   a pivot unit driving the pivot arm so that the cover opens and closes the opening face of the container; and
   a plate spring formed in a single piece so that an intermediate portion thereof is fixed to the pivot arm and both side end portions thereof are fixed to the cover, wherein portions provided between end portions and the intermediate portion respectively are bent.

3. An activating device for a cover as claimed in claim 1, wherein the plate spring is bent so as to form with a bending angle of 90° or larger.

4. An activating device for a cover as claimed in claim 1, wherein a plurality of plate springs are provided.

5. An activating device for a cover as claimed in claim 4, wherein the plurality of plate springs are provided such that at least one pair of plate springs are arranged in a row.

6. An activating device for a cover as claimed in claim 1, wherein the pivot unit is an electric motor with a reduction gear.

7. An activating device for a cover as claimed in claim 1, the plate spring is provided with a pair of the spring pieces.

8. An activating device for a cover as claimed in claim 4, wherein the pivot unit includes a shaft, and
   a plurality of the pivot arms are fixed to the shaft and the plate springs are fixed to the pivot arms respectively.

9. An activating device for a cover as claimed in claim 4, wherein the plate springs are fixed to the cover so as to be in parallel with one another.

10. A vacuum device comprising:
    a vacuum chamber having an opening face;
    a cover which covers the opening face of the container in a sealing manner;
    at least one pivot arm coupled to the cover;
    a pivot unit driving the pivot arm so that the cover opens and closes the opening face of the container; and
    a plate spring provided with at least one spring piece having a first portion fixed to the pivot arm and a second portion fixed to the cover, wherein a portion provided between both the first and second portions is bent.

* * * * *